(12) United States Patent
Reichert et al.

(10) Patent No.: US 10,703,923 B2
(45) Date of Patent: Jul. 7, 2020

(54) NAPHTHALOCYANINE DERIVATIVES

(71) Applicant: BASF SE, Ludwigshafen (DE)

(72) Inventors: Hans Reichert, Rheinfelden (DE); Yves Bron, Delemont (CH); Helmut Reichelt, Neustadt (DE); Oliver Seeger, Mannheim (DE)

(73) Assignee: BASF SE, Ludwigshafen (DE)

( * ) Notice: Subject to any disclaimer, the term of this patent is extended or adjusted under 35 U.S.C. 154(b) by 117 days.

(21) Appl. No.: 15/576,005

(22) PCT Filed: May 31, 2016

(86) PCT No.: PCT/EP2016/062215
§ 371 (c)(1),
(2) Date: Nov. 21, 2017

(87) PCT Pub. No.: WO2016/193237
PCT Pub. Date: Dec. 8, 2016

(65) Prior Publication Data
US 2018/0148586 A1    May 31, 2018

(30) Foreign Application Priority Data
Jun. 2, 2015    (EP) .................................. 15170347

(51) Int. Cl.
| | |
|---|---|
| *C09D 11/037* | (2014.01) |
| *C09D 11/033* | (2014.01) |
| *C09D 11/101* | (2014.01) |
| *C09B 47/04* | (2006.01) |
| *B42D 25/382* | (2014.01) |
| *B42D 25/41* | (2014.01) |
| *B41M 3/14* | (2006.01) |

(52) U.S. Cl.
CPC ............ *C09D 11/037* (2013.01); *B41M 3/14* (2013.01); *B41M 3/146* (2013.01); *B42D 25/382* (2014.10); *B42D 25/41* (2014.10); *C09B 47/045* (2013.01); *C09D 11/033* (2013.01); *C09D 11/101* (2013.01)

(58) Field of Classification Search
None
See application file for complete search history.

(56) References Cited

U.S. PATENT DOCUMENTS

| | | | |
|---|---|---|---|
| 6,174,400 B1 | 1/2001 | Krutak, Sr. et al. | |
| 6,221,279 B1 * | 4/2001 | Strand | C09D 5/22 101/491 |
| 7,122,076 B2 * | 10/2006 | Vonwiller | C09B 47/00 106/31.13 |
| 7,148,345 B2 * | 12/2006 | Vonwiller | C09B 47/00 540/145 |
| 7,559,983 B2 | 7/2009 | Starling et al. | |
| 7,671,194 B2 | 3/2010 | Indusegaram et al. | |
| 7,964,719 B2 | 6/2011 | Vonwiller et al. | |
| 8,282,722 B2 | 10/2012 | Vonwiller et al. | |
| 2008/0241492 A1 | 10/2008 | Demartin Maeder et al. | |
| 2010/0168413 A1 | 7/2010 | Indusegaram et al. | |
| 2010/0263571 A1 * | 10/2010 | Vonwiller | C09B 47/045 106/31.49 |
| 2011/0124883 A1 | 5/2011 | Indusegaram et al. | |
| 2011/0135815 A1 * | 6/2011 | Ganapathiappan | C09D 11/328 427/160 |
| 2011/0311911 A1 | 12/2011 | Kimura et al. | |
| 2017/0051166 A1 * | 2/2017 | Reichert | C07D 487/22 |
| 2018/0251644 A1 * | 9/2018 | Reichert | C07D 487/22 |

FOREIGN PATENT DOCUMENTS

| | | |
|---|---|---|
| CN | 102119193 A | 7/2011 |
| EP | 0 807 670 A1 | 11/1997 |
| EP | 0 933 407 A1 | 8/1999 |
| EP | 2 402 727 A1 | 1/2012 |
| EP | 3067216 A1 * | 9/2016 |
| EP | 3202862 A2 * | 8/2017 |
| JP | 2002-309131 A | 10/2002 |
| WO | 2006/015414 A1 | 2/2006 |
| WO | 2008/006135 A1 | 1/2008 |
| WO | 2009/012514 A1 | 1/2009 |
| WO | WO 2009/015407 A1 | 2/2009 |
| WO | WO 2015/169701 A1 * | 11/2015 |

OTHER PUBLICATIONS

International Search Report dated Aug. 16, 2016 in PCT/EP2016/062215 filed May 31, 2016.
Written Opinion dated Aug. 16, 2016 in Patent Application No. PCT/EP2016/062215.
Extended European Search Report dated Nov. 25, 2015 in Patent Application No. 15170347.7.
William E. Ford, et al., "Synthesis and Photochemical Properties of Aluminum, Gallium, Silicon, and Tin Naphthalocyanines", Inorganic Chemistry, vol. 31, No. 16, 1992, pp. 3371-3377.
John P. Linsky, et al., "Studies of a Series of Haloaluminum, -gallium, and -indium Phthalocyanines", Inorganic Chemistry, vol. 19, No. 10, Oct. 1980, pp. 3131-3135.
U.S. Appl. No. 15/307,964, Non-Final Rejection, dated Feb. 13, 2019.
U.S. Appl. No. 15/364,680, Non-Final Rejection, dated Feb. 13, 2019.
U.S. Appl. No. 15/526,866, Notice of allowance, dated Aug. 16, 2019.
U.S. Appl. No. 15/576,005, 1st Office Action, dated Jun. 27, 2019.

* cited by examiner

*Primary Examiner* — Helene Klemanski
(74) *Attorney, Agent, or Firm* — Oblon, McClelland, Maier & Neustadt, L.L.P.

(57) ABSTRACT

The present invention relates to the use of specific naphthalocyanine chromophores with different axial substituents as almost colourless IR absorbers for security printing applications.

13 Claims, No Drawings

NAPHTHALOCYANINE DERIVATIVES

The present invention relates to the use of specific naphthalocyanine chromophores with different axial substituents as almost colourless IR absorbers for security printing applications.

DESCRIPTION OF THE RELATED ART

Colourless, or at least barely coloured, IR absorbers meet a significant technical need in a wide range of applications, such as security printing (bank notes, credit cards, identity cards, passports etc.), invisible and/or IR readable bar codes, the laser-welding of plastics, the curing of surface-coatings using IR radiators, the drying and curing of print, the fixing of toners on paper or plastics, optical filters for PDPs (plasma display panels), laser marking e.g. of paper or plastics, the heating of plastic preforms, heat shielding applications, etc.

A large number of organic and inorganic substances belonging to different compound classes and with a great variety of different structures are known for the application as IR absorbers. Notwithstanding that large numbers of known compound classes and structures with a complex profile of properties often present difficulties, there is a continuing demand for IR absorbers that are "colourless" (i.e. with the minimum possible inherent colour), and that simultaneously meet the technical stability requirements (chemical stability, heat stability and/or light stability).

A special field of application for colourless IR absorbers regards inks for printing processes which are used for printing currency and other security documents, also referred to as "security printing". Typical security printing processes are processes, wherein an ink composition is employed that is designed to selectively absorb radiation in parts of the "optical infrared" spectrum, whilst being transparent in other parts of it. IR absorbers for security printing are available, for example, from "American Dye Source", but virtually all of them have a noticeable absorption in the visible (VIS) range of the spectrum (from 400 to 700 nm).

WO2006/015414 describes IR-absorbing naphthalocyanine compounds for security printing. These compounds may have different axial substituents and a variety of central atoms. They are characterized in that hydrophilic groups are bonded to the naphthalocyanine rings, for example sulfonic acid groups which render the molecule water soluble.

WO 2008/006135 discloses a specific Ga naphthalocyanine compound with an ethylenoxide derived axial substituent. These types of substituents render the compounds more hydrophilic. So far these compounds have not been suggested for security printing applications.

WO 2009/012514 discloses a further specific Ga naphthalocyanine compound with a O—$C_{16}$alkyl axial substituent which may impart more oil solubility to the compound.

DESCRIPTION OF THE INVENTION

The objective of the instant invention is to select naphthalocyanine compounds which are useful in security printing applications.

Security printing is the field that deals with the printing of items such as currency, passports, tamper-evident labels, stock certificates, postage stamps, identity cards, etc. The main goal of security printing is to prevent forgery, tampering or counterfeiting.

In the field of automated banknote processing, IR-absorption plays an important role. Most of the actually circulating currency carries not only visibly coloured printings, but also specific features which are only detectable in the infrared part of the spectrum. Generally, these IR-features are implemented for use by automatic currency processing equipment, in banking and vending applications (automatic teller machines, automatic vending machines, etc.), in order to recognize a determined currency bill and to verify its authenticity, in particular to discriminate it from replicas made by colour copiers.

All security documents are required to have good stability and durability. In the case of bank notes, these requirements are extreme, as bank notes are subjected to toughest use conditions by the public—they are subjected to material stress by folding, crumpling etc., subjected to abrasion, exposed to weather, exposed to bodily fluids such as perspiration, laundered, dry-cleaned, ironed etc. and, after having been subjected to this, are expected to be as legible as when they started. Furthermore, it is essential that the documents nevertheless should have a reasonable life time, ideally of some years, despite suffering the afore-mentioned conditions. During this time, the documents, and thus the inks on them (including invisible security markings), should be resistant to fading or colour change. Hence, any ink used in a security printing process should, when cured, be robust, water-resistant, resistant to various chemicals and flexible. Moreover, as certain states are moving away from the use of paper as the substrate for bank notes, the employed printing ink formulations should be useable on plastics as well as paper.

Solubility in organic solvents should be low, light stability, heat stability should be as high as possible. The advantageous absorbing properties should thereby not adversely be affected.

Resistance towards acids and alkalines, towards oxidizing and reducing agents should be high.

The problem has been solved by providing Ga or Al naphthalocyanine compounds substituted with specific axial substituents. The selected compounds exhibit very high thermal and light fastness, high resistance against chemicals and solvents without losing their other advantages like colourlessness. Due to their unique application properties they are useful as IR absorbers for security printing, especially for printing bank notes.

The compounds as such are known, however, they have not been used so far in security printing applications.

One aspect of the invention is the use of a compound of formula (Ia) or (Ib) in a printing ink formulation for security printing

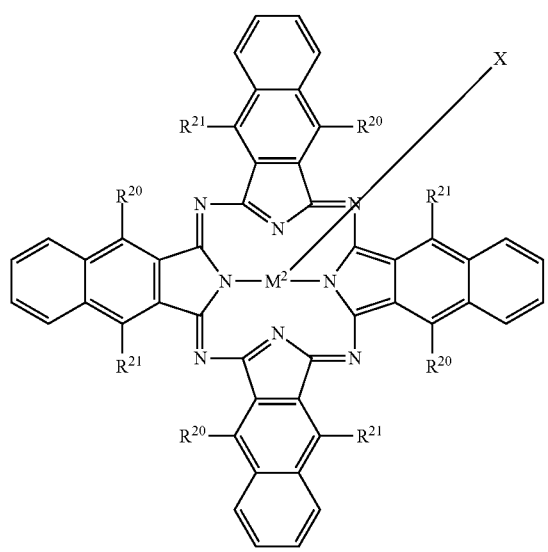
(Ia)

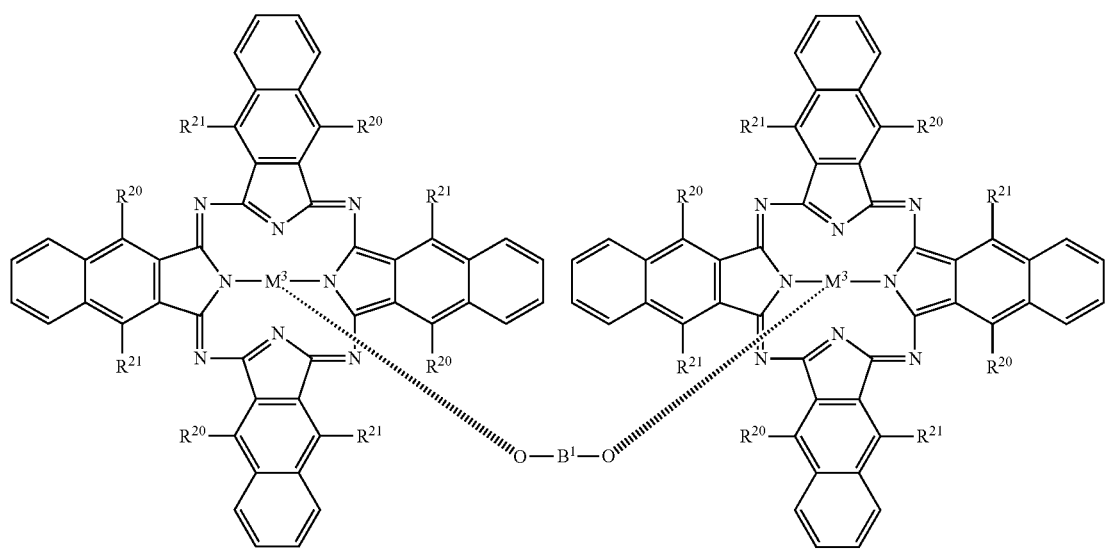
(Ib)

wherein

X is OH, O(C$_2$H$_4$O)$_n$CH$_3$, OC$_8$-C$_{18}$alkyl, OSi(n-C$_1$-C$_{12}$alkyl)$_3$;

n is a integer from 1 to 6;

M$^2$, M$^3$ are Ga;

B$^1$ in formula (Ib) is C$_1$-C$_{12}$alkylene, C$_1$-C$_{12}$alkylene which is interrupted by one or more oxygen atoms or C$_1$-C$_{12}$alkylene which is substituted by at least one OH group;

R$^{20}$ and R$^{21}$ are independently of each other H, F, OR$^{16}$, SR$^{16}$, NHR$^{17}$, or NR$^{17}$R$^{17'}$;

R$^{16}$ is C$_1$-C$_{12}$alkyl, (C$_2$H$_4$O)$_n$OR$^{18}$, or phenyl;

R$^{18}$ is C$_1$-C$_{12}$alkyl;

R$^{17}$ and R$^{17'}$ are independently of each other C$_1$-C$_{12}$alkyl, (C$_2$H$_4$O)$_n$OR$^{18}$, or phenyl; or R$^{17}$ and R$^{17'}$ together may represent a 5- or 6-membered aliphatic ring, wherein one C-atom in the ring may be replaced by oxygen, to form a pyrrolidine, piperidine, 2-methylpiperidine or morpholine radical.

For example X is OH or O(C$_2$H$_4$O)$_n$CH$_3$ and n is 3 or 4, in particular X is O(C$_2$H$_4$O)$_n$CH$_3$ and n is 3.

For instance X is O(C$_2$H$_4$O)$_n$CH$_3$ and n is 3 or 4.

In a specific embodiment B$^1$ in formula (Ib) is —CH$_2$—CH$_2$— or —CH$_2$—HC(OH)—CH$_2$—.

Preferably R$^{20}$ and R$^{21}$ are independently of each other H or OR$^{16}$ and R$^{16}$ is C$_1$-C$_{12}$alkyl, in particular R$^{20}$ and R$^{21}$ are H.

In a specific embodiment in formula (Ia) M$^2$ is Ga, X is O(C$_2$H$_4$O)$_n$CH$_3$ and n is 3 or 4 and R$^{20}$ and R$^{21}$ are H.

Alkyl may be linear or branched, preferably alkyl is linear alkyl.

Alkylene is preferably linear and where applicable preferably C$_1$-C$_6$.

The IR absorbers of the general formula (Ia) and (Ib) may also be used as mixtures.

The compounds are known and may be prepared by standard methods as, for example, described in U.S. Pat. No. 7,559,983, WO 2008006135, W. E. Ford et al, Inorg. Chem. 1992, 31, 3371-3377 (X=OH, OSi(n-C6H13)3), U.S. Pat. No. 7,964,719 (—OC2H4O— Dimer) and WO 2009/012514.

The compounds of the general formula (Ia) and (Ib) have at least one of the following advantageous properties:

good fastness to chemicals, in particular fastness to bleaching with hypochlorite, fastness to acids and alkalines and fastness to solvents (like toluene, acetone or dichloromethane), good fastness to boiling water, good fastness to light, almost colourless (i.e. minimal absorption in the VIS range of the spectrum (from 400 to 700 nm))

good heat stability, high compatibility with a multiplicity of formulations, in particular printing ink formulations used especially in security printing.

Preferably the printing ink is a non-aqueous printing ink.

The compounds of formula (Ia) and (Ib) when incorporated in a printing ink are in the form of insoluble particles.

For example the compounds of formula (Ia) and (Ib) have a mean particle size of from 15 nm to 1000 nm, preferably from 50 nm to 500 nm. The particle size can be measured, for example, with a laser method, such as dynamic light scattering or with transmission electron microscopy (TEM).

In a specific embodiment the compounds of formula (Ia) or (Ib) are used in a printing ink formulation for security printing to improve the fastness properties of the obtained print, in particular to improve the fastness to chemicals, solvents and/or boiling water.

In a further aspect, the invention provides a printing ink formulation for security printing, comprising at least one compound of the formula (Ia) or (Ib) or mixtures thereof as defined above.

In a specific embodiment the printing ink formulation, for security printing, comprises a) at least one compound of the formula (Ia) or (Ib) or mixtures thereof as defined above, b) a polymeric binder, c) optionally a solvent, d) optionally at least one colorant, e) optionally at least one further additive and f) optionally at least one photoinitiator.

More specific the printing ink formulation comprises a) 0.0001 to 25% by weight of at least one compound of the formula (I) or (Ib) or mixtures thereof as defined above, b) 5 to 74% by weight of at least one polymeric binder, c) 1 to 94.9999% by weight of at least one solvent, d) 0 to 25% by weight of at least one colorant, and e) 0 to 25% by weight of at least one further additive, wherein the sum of components a) to e) adds up to 100%.

The printing ink formulation according to the invention may contain an additional colorant d). Preferably, the printing ink formulation contains from 0 to 25% by weight, more preferably from 0.1 to 20% by weight, in particular from 1 to 15% by weight, based on the total weight of the printing ink formulation, of a colorant d).

Suitable colorants d) are selected from conventional dyes and in particular from conventional pigments. The term "pigment" is used in the context of this invention comprehensively to identify all pigments and fillers, examples being colour pigments, white pigments, and inorganic fillers. These include inorganic white pigments, such as titanium dioxide, preferably in the rutile form, barium sulfate, zinc oxide, zinc sulfide, basic lead carbonate, antimony trioxide, lithopones (zinc sulfide+barium sulfate), or coloured pigments, examples being iron oxides, Bismuthvanadates, Ni/Sb-doped Titaniumdioxides, Cr/Sb-doped Titaniumdioxides, carbon black, graphite, zinc yellow, zinc green, ultramarine, manganese black, antimony black, manganese violet, Paris blue or Schweinfurt green. Besides the inorganic pigments the printing ink formulation of the invention may also comprise organic colour pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions. Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc.

The printing ink formulation may comprise at least one colorant for establishing a desired hue, especially transparent organic pigments and dyes, for example C.I. Pigment Yellow 13, 14, 17, 74, 138, 139, 147, 150, 151, 155, 183, 185 192 and 196, C.I. Pigment Orange 34, 64, 70, C.I. Pigment Red 48:1, 48:2, 57:1, 149, 178 and 179, 181, 263, C.I. Pigment Violet 19, 37 and 29, C.I. Pigment Blue 15, 15:1, 15:3 and 15:4, 15:6, 16, 60, C.I. Pigment Green 7 and 36, C.I. Solvent Yellow 14, 21, 93, 130, 133, 145, 162, 163, C.I. Solvent Red 52, 135, 195, 213, 214 and 225, C.I. Solvent Blue 35, 45, 67, 68, 97, 104, 122, 132, C.I. Solvent Violet 13, 46, 49, C.I. Solvent Green 3, 5 and 28, C.I. Solvent Orange 47, 60, 86, 114, and 163, C.I. Solvent Brown 35, 53, and also C.I. Disperse Yellow 54, 87, 201, C.I. Disperse Orange 30, C.I. Disperse Red 60 and C.I. Disperse Violet 57.

The printing ink formulation according to the invention may contain at least one additive e). Preferably, the printing ink formulation contains from 0 to 25% by weight, more preferably from 0.1 to 20% by weight, in particular from 1 to 15% by weight, based on the total weight of the printing ink formulation, of at least one component e).

Suitable additives (component e)) are selected from plasticizers, waxes, siccatives, antistatic agents, chelators, antioxidants, stabilizers, adhesion promoters, surfactants, flow control agents, defoamers, biocides, thickeners, etc. and combinations thereof. These additives serve in particular for fine adjustment of the application-related properties of the printing ink, examples being adhesion, abrasion resistance, drying rate, or slip.

A further possible additive group is that of additives which likewise modify the visual appearance, the mechanical properties or else the tactile properties, for example matting agents, such as titanium dioxide, chalk, barium sulfate, zinc sulfide, fillers, such as nanoparticulate silicon dioxide, aluminium hydroxide, clay and other sheet silicates, glass fibers and glass spheres.

In security printing, the compounds of formula (Ia) and (Ib) are added to a printing ink formulation. Suitable printing inks are oil-based, solvent-based, water-based and UV- or EB-curing printing inks, based on pigment or dye, for inkjet printing, gravure printing, flexographic printing, screen printing, intaglio printing, offset printing, laser-printing or letterpress printing and for use in electrophotography. Printing inks for these printing processes usually comprise solvents, binders, and also various additives, such as plasticizers, antistatic agents or waxes. Printing inks for offset printing, letterpress printing, screen printing and intaglio printing are usually formulated as high-viscosity paste printing inks, whereas printing inks for flexographic printing, gravure printing and inkjet printing are usually formulated as liquid printing inks with comparatively low viscosity.

In the context of the present invention, the expression "printing ink" also encompasses formulations that in addition to at least one IR absorber of the general formula (Ia)

or (Ib) may comprise a colorant. The expression "printing ink" also encompasses printing lacquers that comprise no colorant.

Suitable components of printing inks are conventional and are well known to those skilled in the art. Examples of such components are described in "Printing Ink Manual", fourth edition, Leach R. H. et al. (eds.), Van Nostrand Reinhold, Wokingham, (1988). Details of printing inks and their formulation are also disclosed in "Printing Inks"-Ullmann's Encyclopedia of Industrial Chemistry, Sixth Edition, 1999 Electronic Release. A formulation of an IR-absorbing intaglio ink formulation is described in US 20080241492 A1. The disclosure of the afore-mentioned documents is incorporated herein by reference.

The printing ink formulation according to the invention contains in general from 0.0001 to 25% by weight, preferably from 0.001 to 15% by weight, in particular from 0.01 to 5% by weight, based on the total weight of the printing ink formulation, of at least one compound of formula (Ia) and/or (Ib), component a).

The compounds of formula (Ia) and (Ib) are present in the printing ink formulation in solid form (in a finely divided state), due to their pigment properties.

The printing ink formulation according to the invention contains in general from 5 to 74% by weight, preferably from 10 to 60% by weight, more preferably from 15 to 40% by weight, based on the total weight of the printing ink formulation, of a binder, component b).

Suitable polymeric binders b) for the printing ink formulation according to the invention are for example selected from natural resins, phenol resin, phenol-modified resins, alkyd resins, polystyrene homo- and copolymers, terpene resins, silicone resins, polyurethane resins, urea-formaldehyde resins, melamine resins, polyamide resins, polyacrylates, polymethacrylates, chlorinated rubber, vinyl ester resins, acrylic resins, epoxy resins, nitrocellulose, hydrocarbon resins, cellulose acetate, and mixtures thereof.

The printing ink formulation according to the invention can also comprise components that form a polymeric binder by a curing process. Thus, the printing ink formulation according to the invention can also be formulated to be energy-curable, e.g. able to be cured by UV light or EB (electron beam) radiation. In this embodiment, the binder comprises one or more curable monomers and/oligomers. Corresponding formulations are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

Suitable monomers and oligomers (also referred to as prepolymers) include epoxy acrylates, acrylated oils, urethane acrylates, polyester acrylates, silicone acrylates, acrylated amines, and acrylic saturated resins. Further details and examples are given in "Chemistry & Technology of UV & EB Formulation for Coatings, Inks & Paints", Volume II: Prepolymers & Reactive Diluents, edited by G Webster.

If a curable polymeric binder is employed, it may contain reactive diluents, i.e. monomers which act as a solvent and which upon curing are incorporated into the polymeric binder. Reactive monomers are typically chosen from acrylates or methacrylates, and can be mono functional or multifunctional. Examples of multifunctional monomers include polyester acrylates or methacrylates, polyol acrylates or methacrylates, and polyether acrylates or methacrylates.

In the case of printing ink formulations to be cured by UV radiation, it is usually necessary to include at least one photoinitiator to initiate the curing reaction of the monomers upon exposure to UV radiation. Examples of useful photoinitiators can be found in standard textbooks such as "Chemistry & Technology of UV & EB Formulation for Coatings, Inks & Paints", Volume III, "Photoinitiators for Free Radical Cationic and Anionic Polymerisation", 2nd edition, by J. V. Crivello & K. Dietliker, edited by G. Bradley and published in 1998 by John Wiley & Sons in association with SITA Technology Limited. It may also be advantageous to include a sensitizer in conjunction with the photoinitiator in order to achieve efficient curing.

When the compounds of formula (Ia) and (Ib) are incorporated in a UV curable printing formulation, the formulation comprises typically a) 0.0001 to 25% by weight of at least one compound of the formula (I) or (Ib) or mixtures thereof as defined above,
b) 5 to 70% by weight of at least one UV curable polymeric binder,
c) 1 to 80.9999% by weight of at least one reactive diluent,
d) 0 to 25% by weight of at least one colorant, and
e) 0 to 25% by weight of at least one further additive,
f) 1 to 14% of at least one photoinitiator
wherein the sum of components a) to f) adds up to 100%.

A preferred embodiment is a printing ink formulation wherein the polymeric binder is an oxidative drying resin.

Oxidation is the classical drying mechanism for lithographic inks, involving the oxygen-induced free radical polymerisation of unsaturated (drying) polymers, such as vegetable oils, for example, linseed oil and tung oil. The oxidant is atmospheric oxygen. It is a chemical process which can be catalysed (accelerated) by small amounts of appropriate metal, usually transition metal, driers, such as cobalt and/or manganese catalysts (siccatives). Suitable oxidative drying inks are for example described in EP 807 670.

When a solvent based printing ink formulation is used, the printing ink formulation contains in general from 1 to 94.9999% by weight, preferably from 5 to 90% by weight, in particular from 10 to 85% by weight, based on the total weight of the printing ink formulation, of a solvent c).

Suitable solvents are selected from organic solvents. For the purpose of the invention, reactive monomers which also act as solvents are regarded as part of the afore-mentioned binder component b).

Examples of solvents comprise alcohols, e.g. ethanol, 1-propanol, 2-propanol, ethylene glycol, propylene glycol, diethylene glycol and ethoxy propanol; esters, e.g. ethyl acetate, isopropyl acetate, n-propyl acetate and n-butyl acetate; ketones, e.g. methylethylketone, cyclohexanone; hydrocarbons, e.g. toluene, xylene, mineral oils and vegetable oils, water, and mixtures thereof.

The printing ink formulations according to the invention are advantageously prepared in a conventional manner, for example by mixing the individual components. As mentioned earlier, the compounds of formula (Ia) and (Ib) are present in the printing ink formulations in a finely divided solid form. Additional colorants may be employed in the printing ink formulation of the invention or in a separate ink formulation. When additional colorants are to be employed in a separate formulation, the time of application of the printing ink formulation according to the invention is usually immaterial. The printing ink formulation according to the invention can for example be applied first and then be overprinted with conventional printing inks. But it is also possible to reverse this sequence or, alternatively, to apply the printing ink formulation according to the invention in a mixture with conventional printing inks. In every case the prints are readable with suitable light sources.

Primers can be applied prior to the printing ink formulation according to the invention. By way of example, the primers are applied in order to improve adhesion to the substrate. It is also possible to apply additional printing lacquers, e.g. in the form of a covering to protect the printed image. Additional printing lacquers may also be applied to serve aesthetic purposes, or serve to control application-related properties. By way of example, suitably formulated additional printing lacquers can be used to influence the roughness of the surface of the substrate, the electrical properties, or the water-vapour-condensation properties. Printing lacquers are usually applied in-line by means of a lacquering system on the printing machine employed for printing the printing ink formulation according to the invention.

The printing ink formulations according to the invention are also suitable for use in multilayer materials. Multilayer materials are e.g. composed of two or more plastics foils, such as polyolefin foils, metal foils, or metallised plastics foils, which are bonded to one another, by way of example, via lamination or with the aid of suitable laminating adhesives. These composites may also comprise other functional layers, such as odour-barrier layers or water-vapour barriers.

These layers may additionally comprise one or more UV absorbers. UV absorbers are well known in the plastics, coatings and cosmetic industry. Examples for suitable UV absorbers are subsequently given.

2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl α-cyano-β,β-diphenylacrylate, isooctyl α-cyano-β,β-diphenylacrylate, methyl α-carbomethoxycinnamate, methyl α-cyano-β-methyl-β-methoxycinnamate, butyl α-cyano-β-methyl-β-methoxycinnamate, methyl α-carbomethoxy-pmethoxycinnamate, N-(β-carbomethoxy-β-cyanovinyl)-2-methylindoline, neopentyl tetra(α-cyano-β,β-diphenylacrylate.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3, 5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1, 3,5-triazine.

Also an aspect of the invention is a process for the manufacture of a security document comprising the steps printing on a substrate a printing ink formulation as described above.

In another aspect the security document, comprises a substrate, a cured ink which ink comprises at least one compound of the formula (Ia) or (Ib) as defined above. The security document may be a bank note, a passport, a check, a voucher, an ID- or transaction card, a stamp and a tax label.

Yet in a further aspect, the invention provides a security document, obtainable by a printing process, wherein a printing ink formulation is employed that comprises at least one compound of the formula (Ia) or (Ib) as defined above.

For example the security document is part of a rigid or flexible packaging, of a carton board or of a brand or product label.

The IR absorbers of formula (Ia) and (Ib) can also be used in the form of a mixture, comprising at least one compound of the general formula (Ia) and (Ib). It is, however, also possible that one further IR absorber different from compounds of the general formula (Ia) and (Ib) is additionally added. Suitable further IR absorbers are in principle all known classes of IR absorbers that are compatible with the compounds of the general formula (Ia) and (Ib).

Preferred further IR absorbers are selected from polymethines, phthalocyanines, quinone-diimmonium salts, aminium salts, rylenes, inorganic IR absorbers and mixtures thereof. Further polymethine IR absorbers are preferably selected from cyanines, squaraines, croconaines, dithiolenes and mixtures thereof. Further inorganic IR absorbers are preferably selected from indium tin oxide, antimony tin oxide, lanthanum hexaboride, tungsten bronzes, copper salts etc.

The additional IR absorbers can be generally used in a concentration of from 10 ppm to 25%, preferably 100 ppm to 10%.

The definitions and preferences given above apply equally for all aspects of the invention.

Various features and aspects of the present invention are illustrated further in the examples that follow.

Unless otherwise indicated in the following examples and elsewhere in the specification and claims, all parts and percentages are by weight, temperatures are in degrees centigrade and pressures are at or near atmospheric.

EXAMPLES

Preparation Examples

The compounds are known and may be prepared by standard methods as, for example, described in U.S. Pat. No. 7,559,983, WO 2008006135, J. P. Linsky et al, Inorg. Chem. 1980, 19, 3131-3135 (X=Cl, F), W. E. Ford et al, Inorg. Chem. 1992, 31, 3371-3377 (X=OH, Cl, F, OSi(n-$C_6H_{13}$)$_3$), U.S. Pat. No. 7,964,719 (—$OC_2H_4O$— Dimer) and WO 2009/012514.

Application Examples

Example 1

A solvent based gravure ink is prepared by mixing the following components 115 g SAZ beads, diameter 1.0-1.25 mm 56.72 g NC-varnish 0.57 g Pigment, according to example 6 of U.S. Pat. No. 7,671,194 in a Skandex (Lau, Hagen) for 90 minutes. The ink is then diluted 1:1 with NC-varnish, so that the final pigment concentration is 0.5%.

The resulting final ink is applied with a K bar coater N° 1 (6 μm) onto Algro Finess 2000 paper.

NC-varnish:

| | |
|---|---|
| 16.5 parts | Nitrocellulose (NC) chips A 400 ATBC 20% (Wolff Cellulosics GmbH) |
| 20 parts | Ethylacetat |
| 10 parts | Solvenon PM |
| 53.5 parts | Ethanol |

Comparative Example 2

A solvent based gravure ink is prepared by mixing the following components 115 g SAZ beads, diameter 1.0-1.25 mm 56.72 g NC-varnish 0.57 g Pigment, according to the component number 4 in U.S. Pat. No. 8,282,722 in a Skandex (Lau, Hagen) for 90 minutes. The final pigment concentration is 1.0%.

The resulting final ink is applied with a K bar coater N° 1 (6 μm) onto Algro Finess 2000 paper.

The maximum NIR-absorbance of example 1) and comparative example 2) measured on the applied ink with a UV/VIS/NIR spectrophotometer is in the same range, as demonstrated in Table 5.

That means, that the NIR-absorbance efficiency of the pigment from example 1 is twice of that from the comparative example 2, given the fact that the pigment concentration is half.

Tested Fastness Properties:

The draw-downs were exposed for 30 minutes to the below chemicals. After the exposure to the chemicals, the sample was treated in the following way:

P: Sample dried between tissue after test

W: Sample first rinsed with water and then dried between tissue

The fastness properties were assessed from the drawdown using a grey scale according to ISO 105-A02.

TABLE 1

| Test substance | Time | Cleaning | Example 1 Rating | Comparative example 2 Rating |
|---|---|---|---|---|
| Xylene | 30 Min. | P | 5 | 5 |
| White spirit | 30 Min. | P | 5 | 5 |
| Acetic acid, 20% | 30 Min. | W | 5 | 4 |
| Sodium hydroxide, 5% | 30 Min. | P | 5 | 4 |
| Hydrogenperoxide, 5% | 30 Min. | W | 5 | 4 |
| Sodiumhypochlorite, 5% ig | 30 Min. | W | 5 | 3 |
| Sulfuric acid, 5% | 30 Min. | W | 5 | 3-4 |
| Hydrochloric acid, 5% | 30 Min. | W | 5 | 3 |
| Water at 100° C. | 30 Min. | P | 5 | 5 |

TABLE 2

| Light fastness, ISO 105-602: exposure behind window class | Example 1 Rating | Comparative example 2 Rating | Comment |
|---|---|---|---|
| after 240 h exposure | 7 | 7 | Rating per BWS (Blue wool scale) |

Example 3

A UV-curable gravure ink is prepared by mixing the following components

Mill Base:

115 g SAZ beads, diameter 1.0-1.25 mm 55.01 g Lumogen® OVD primer 301

0.57 g EFKA PX 4731

1.72 g Pigment, according to example 6 of U.S. Pat. No. 7,671,194 in a Skandex (Lau, Hagen) for 90 minutes. The mill base is then diluted:

2 g mill base
2 g Laromer® DPGDA
2 g Lumogen® OVD primer 301
are mixed together by shaking.

The final pigment concentration is 1.0%.

The resulting final ink is applied with a K bar coater N° 1 (6 μm) onto Algro Finess 2000 paper.

Comparative Example 4

A UV-curable gravure ink is prepared by mixing the following components

Mill Base:
115 g SAZ beads, diameter 1.0-1.25 mm
55.01 g Lumogen® OVD primer 301
0.57 g EFKA PX 4731
1.72 g Pigment, according to example 4 of U.S. Pat. No. 8,282,722 in a Skandex (Lau, Hagen) for 90 minutes. The mill base is then diluted:

2 g mill base
2 g Laromer® DPGDA
2 g Lumogen® OVD primer 301
are mixed together by shaking.

The final pigment concentration is 1.0%.

The resulting final ink is applied with a K bar coater N° 2 (12 μm) onto Algro Finess 2000 paper.

The maximum NIR-absorbance of example 3) and 4) measured on the applied ink with a UV/VIS/NIR spectrophotometer is in the same range as demonstrated in Table 6.

That means, that the NIR-absorbance efficiency of the pigment from example 3 is twice of that from the comparative example 4, given the fact that the applied layer thickness of the ink from example 3 is half of that of example 4.

Tested Fastness Properties:

The draw-downs were exposed for 30 minutes to the below chemicals. After the exposure to the chemicals, the sample was treated in the following way:

P: Sample dried between tissue after test
W: Sample first rinsed with water and then dried between tissue The fastness properties were assessed from the drawdown using a grey scale according to ISO 105-A02.

TABLE 3

| Test substance | Time | Cleaning | Example 3 | Comparative example 4 Rating |
|---|---|---|---|---|
| Ethanol, 95% | 30 Min. | P | 5 | 5 |
| NC-solvent blend | 30 Min. | P | 5 | 5 |
| Xylene | 30 Min. | P | 5 | 5 |
| Acetone | 30 Min. | P | 5 | 5 |
| White spirit | 30 Min. | P | 5 | 5 |
| Acetic acid, 20% | 30 Min. | W | 5 | 5 |
| Sodium hydroxide, 5% | 30 Min. | P | 5 | 5 |
| Hydrogenperoxide, 5% | 30 Min. | W | 5 | 5 |
| Diethylenglycol | 30 Min. | W | 5 | 5 |
| Sodiumhypochlorite, 5% ig | 30 Min. | W | 5 | 4-5 |
| Sulfuric acid, 5% | 30 Min. | W | 5 | 4 |
| Hydrochloric acid, 5% | 30 Min. | W | 5 | 4 |

TABLE 3-continued

| Test substance | Time | Cleaning | Example 3 | Comparative example 4 Rating |
|---|---|---|---|---|
| Washing powder at 95° C. (0.5% Persil + 1% Na$_2$CO3) | 30 Min. | W | 5 | 5 |
| Water at 100° C. | 30 Min. | P | 5 | 5 |

TABLE 4

| Light fastness, ISO 105-B02: exposure behind window class | Example 3 Rating | Comparative example 4 Rating | Comment |
|---|---|---|---|
| after 240 h exposure | 7 | 4 | Rating per BWS (Blue wool scale) |

TABLE 5

| wavelength [nm] | Algro Finess 2000 | 0.5% example 6 of U.S. Pat. No. 7,671,194, K-bar coater N°1 | 1.0% component number 4 of U.S. Pat. No. 8,282,722, K-bar coater N°1 |
|---|---|---|---|
| 400 | 77.6 | 47.1 | 46.7 |
| 410 | 80.3 | 49.6 | 49.2 |
| 420 | 82.5 | 51.7 | 51.3 |
| 430 | 84.4 | 53.1 | 53.2 |
| 440 | 86.0 | 54.7 | 55.4 |
| 450 | 87.5 | 57.0 | 58.4 |
| 460 | 88.6 | 58.7 | 62.1 |
| 470 | 89.7 | 59.6 | 66.6 |
| 480 | 90.4 | 63.6 | 70.5 |
| 490 | 91.0 | 70.0 | 73.4 |
| 500 | 91.4 | 76.3 | 75.5 |
| 510 | 91.8 | 79.5 | 77.6 |
| 520 | 92.0 | 80.5 | 79.3 |
| 530 | 92.0 | 80.6 | 80.9 |
| 540 | 92.3 | 82.2 | 82.7 |
| 550 | 92.6 | 84.5 | 84.4 |
| 560 | 92.6 | 85.5 | 85.4 |
| 570 | 92.5 | 85.8 | 85.3 |
| 580 | 92.8 | 86.0 | 85.5 |
| 590 | 93.2 | 86.2 | 85.2 |
| 600 | 93.5 | 85.7 | 84.0 |
| 610 | 93.7 | 84.5 | 82.2 |
| 620 | 94.0 | 82.8 | 80.0 |
| 630 | 94.3 | 80.8 | 77.3 |
| 640 | 94.7 | 78.5 | 74.1 |
| 650 | 95.1 | 75.9 | 70.3 |
| 660 | 95.4 | 72.8 | 66.5 |
| 670 | 95.7 | 69.1 | 63.0 |
| 680 | 96.0 | 65.4 | 60.2 |
| 690 | 95.9 | 62.0 | 57.4 |
| 700 | 96.0 | 59.2 | 54.9 |
| 710 | 95.9 | 56.5 | 52.9 |
| 720 | 96.0 | 54.2 | 51.5 |
| 730 | 96.3 | 52.1 | 50.9 |
| 740 | 96.6 | 50.5 | 50.5 |
| 750 | 96.7 | 49.3 | 50.0 |
| 760 | 96.9 | 49.0 | 49.6 |

TABLE 5-continued

| wavelength [nm] | Algro Finess 2000 | 0.5% example 6 of U.S. Pat. No. 7,671,194, K-bar coater N°1 | 1.0% component number 4 of U.S. Pat. No. 8,282,722, K-bar coater N°1 |
|---|---|---|---|
| 770 | 96.9 | 49.0 | 48.9 |
| 780 | 97.2 | 49.4 | 48.3 |
| 790 | 97.1 | 49.7 | 47.5 |
| 800 | 97.2 | 49.8 | 47.1 |
| 810 | 97.0 | 49.6 | 46.9 |
| 820 | 97.3 | 49.3 | 47.3 |
| 830 | 97.0 | 48.8 | 47.8 |
| 840 | 96.9 | 48.9 | 48.8 |
| 850 | 97.3 | 49.3 | 50.4 |
| 860 | 96.2 | 50.0 | 51.9 |
| 870 | 97.0 | 52.0 | 54.7 |
| 880 | 96.6 | 53.7 | 57.0 |
| 890 | 97.0 | 56.0 | 59.7 |
| 900 | 96.9 | 58.5 | 62.1 |
| 910 | 96.9 | 61.4 | 64.3 |
| 920 | 97.0 | 65.2 | 66.9 |
| 930 | 97.0 | 69.2 | 69.6 |
| 940 | 96.9 | 73.2 | 72.5 |
| 950 | 97.0 | 77.2 | 75.7 |
| 960 | 96.8 | 80.6 | 78.8 |
| 970 | 96.7 | 83.8 | 81.6 |
| 980 | 96.8 | 86.7 | 84.2 |
| 990 | 96.8 | 89.1 | 86.4 |
| 1000 | 96.7 | 90.9 | 88.1 |
| 1010 | 96.7 | 92.3 | 89.7 |
| 1020 | 96.8 | 93.4 | 90.9 |
| 1030 | 96.9 | 94.2 | 91.9 |
| 1040 | 96.9 | 94.7 | 92.8 |
| 1050 | 97.0 | 95.2 | 93.5 |
| 1060 | 97.0 | 95.4 | 94.0 |
| 1070 | 97.1 | 95.7 | 94.5 |
| 1080 | 97.1 | 95.9 | 94.9 |
| 1090 | 97.2 | 96.1 | 95.2 |
| 1100 | 97.2 | 96.2 | 95.6 |
| 1110 | 97.3 | 96.4 | 95.9 |
| 1120 | 97.3 | 96.4 | 96.0 |
| 1130 | 97.3 | 96.5 | 96.2 |
| 1140 | 97.2 | 96.4 | 96.2 |
| 1150 | 96.9 | 96.2 | 96.0 |
| 1160 | 96.6 | 95.9 | 95.9 |
| 1170 | 96.2 | 95.5 | 95.5 |
| 1180 | 95.8 | 95.1 | 95.2 |
| 1190 | 95.2 | 94.6 | 94.7 |
| 1200 | 94.9 | 94.2 | 94.4 |

TABLE 6

| Wellenlänge nm | Algro Finess 2000 | 1.0% example 6 of U.S. Pat. No. 7,671,194, K-bar coater N°1 | 1.0% component number 4 of U.S. Pat. No. 8,282,722, K-bar coater N°2 |
|---|---|---|---|
| 400 | 77.6 | 34.4 | 32.8 |
| 410 | 80.3 | 37.5 | 36.6 |
| 420 | 82.5 | 40.0 | 39.6 |
| 430 | 84.4 | 41.7 | 42.1 |
| 440 | 86.0 | 43.3 | 45.0 |
| 450 | 87.5 | 45.5 | 48.7 |
| 460 | 88.6 | 47.1 | 53.3 |
| 470 | 89.7 | 47.8 | 57.9 |
| 480 | 90.4 | 51.6 | 61.1 |
| 490 | 91.0 | 58.4 | 63.8 |
| 500 | 91.4 | 65.4 | 65.8 |
| 510 | 91.8 | 69.3 | 69.2 |
| 520 | 92.0 | 70.6 | 71.3 |
| 530 | 92.0 | 70.9 | 73.4 |
| 540 | 92.3 | 73.0 | 76.2 |
| 550 | 92.6 | 75.9 | 79.3 |
| 560 | 92.6 | 77.6 | 80.0 |
| 570 | 92.5 | 78.2 | 79.7 |
| 580 | 92.8 | 78.3 | 79.4 |
| 590 | 93.2 | 78.2 | 78.0 |
| 600 | 93.5 | 77.3 | 75.7 |
| 610 | 93.7 | 75.5 | 72.9 |
| 620 | 94.0 | 73.0 | 69.6 |
| 630 | 94.3 | 70.2 | 65.8 |
| 640 | 94.7 | 67.2 | 61.6 |
| 650 | 95.1 | 64.2 | 57.7 |
| 660 | 95.4 | 60.8 | 54.4 |
| 670 | 95.7 | 57.2 | 51.8 |
| 680 | 96.0 | 54.0 | 49.6 |
| 690 | 95.9 | 51.3 | 47.3 |
| 700 | 96.0 | 49.1 | 45.3 |
| 710 | 95.9 | 47.1 | 44.0 |
| 720 | 96.0 | 45.3 | 43.4 |
| 730 | 96.3 | 43.8 | 43.0 |
| 740 | 96.6 | 42.6 | 42.6 |
| 750 | 96.7 | 41.7 | 41.9 |
| 760 | 96.9 | 41.3 | 41.3 |
| 770 | 96.9 | 41.3 | 40.4 |
| 780 | 97.2 | 41.5 | 39.7 |
| 790 | 97.1 | 41.8 | 39.2 |
| 800 | 97.2 | 41.9 | 38.9 |
| 810 | 97.0 | 41.9 | 39.1 |
| 820 | 97.3 | 41.9 | 39.9 |
| 830 | 97.0 | 41.6 | 40.9 |
| 840 | 96.9 | 41.8 | 42.0 |
| 850 | 97.3 | 42.3 | 43.7 |
| 860 | 96.2 | 42.6 | 45.1 |
| 870 | 97.0 | 43.8 | 47.8 |
| 880 | 96.6 | 44.5 | 50.0 |
| 890 | 97.0 | 45.6 | 52.4 |
| 900 | 96.9 | 46.9 | 54.8 |
| 910 | 96.9 | 48.7 | 57.2 |
| 920 | 97.0 | 51.3 | 60.2 |
| 930 | 97.0 | 54.3 | 63.4 |
| 940 | 96.9 | 57.9 | 67.0 |
| 950 | 97.0 | 62.1 | 70.7 |
| 960 | 96.8 | 66.4 | 74.2 |
| 970 | 96.7 | 70.9 | 77.5 |
| 980 | 96.8 | 75.4 | 80.6 |
| 990 | 96.8 | 79.5 | 83.3 |
| 1000 | 96.7 | 82.9 | 85.5 |
| 1010 | 96.7 | 85.9 | 87.4 |
| 1020 | 96.8 | 88.1 | 89.0 |
| 1030 | 96.9 | 89.7 | 90.3 |
| 1040 | 96.9 | 91.0 | 91.4 |
| 1050 | 97.0 | 91.9 | 92.3 |
| 1060 | 97.0 | 92.6 | 93.1 |
| 1070 | 97.1 | 93.1 | 93.6 |
| 1080 | 97.1 | 93.5 | 94.2 |
| 1090 | 97.2 | 93.9 | 94.6 |
| 1100 | 97.2 | 94.2 | 95.0 |
| 1110 | 97.3 | 94.5 | 95.4 |
| 1120 | 97.3 | 94.7 | 95.5 |
| 1130 | 97.3 | 94.8 | 95.7 |
| 1140 | 97.2 | 94.7 | 95.6 |
| 1150 | 96.9 | 94.6 | 95.4 |
| 1160 | 96.6 | 94.3 | 95.2 |
| 1170 | 96.2 | 93.9 | 94.7 |
| 1180 | 95.8 | 93.4 | 94.2 |

TABLE 6-continued

| Wellenlänge nm | Algro Finess 2000 | 1.0% example 6 of U.S. Pat. No. 7,671,194, K-bar coater N°1 | 1.0% component number 4 of U.S. Pat. No. 8,282,722, K-bar coater N°2 |
|---|---|---|---|
| 1190 | 95.2 | 92.9 | 93.8 |
| 1200 | 94.9 | 92.5 | 93.7 |

The invention claimed is:

1. A method for security printing, the method comprising:
contacting a printing ink formulation comprising a compound with a substrate,
wherein the compound is represented by the following formula (Ia) or the following formula (Ib):

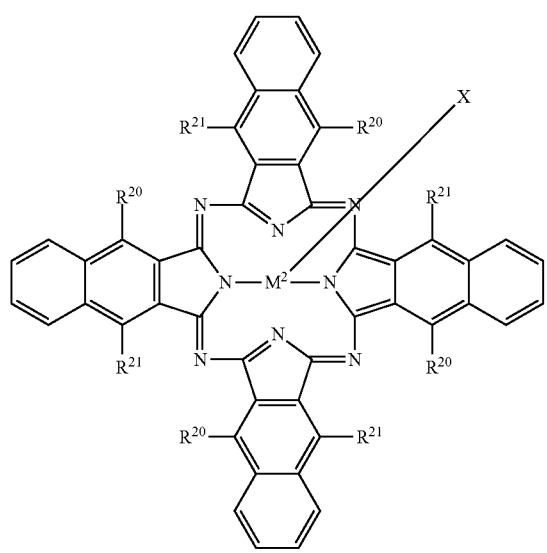

(Ia)

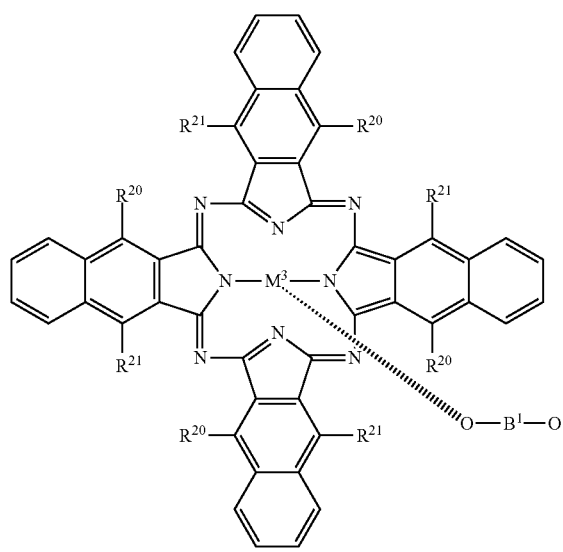

(Ib)

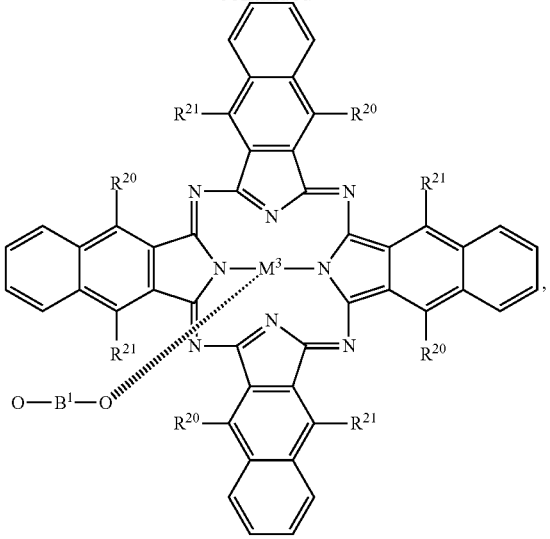

wherein
X is $O(C_2H_4O)_nCH_3$, $OC_8$-$C_{18}$alkyl, or $OSi(n$-$C_1$-$C_{12}alkyl)_3$;
n is a integer from 1 to 6;
$M^2$, $M^3$ are Ga;
$B^1$ in the formula (Ib) is $C_1$-$C_{12}$alkylene, $C_1$-$C_{12}$alkylene which is interrupted by one or more oxygen atoms or $C_1$-$C_{12}$alkylene which is substituted by at least one OH group;
$R^{20}$ and $R^{21}$ are independently of each other H, F, $OR^{16}$, $SR^{16}$, $NHR^{17}$, or $NR^{17}R^{17'}$;
$R^{16}$ is $C_1$-$C_{12}$alkyl, $(C_2H_4O)_nOR^{18}$, or phenyl;
$R^{18}$ is $C_1$-$C_{12}$alkyl; and
$R^{17}$ and $R^{17'}$ are independently of each other $C_1$-$C_{12}$alkyl, $(C_2H_4O)_nOR^{18}$, or phenyl; or
$R^{17}$ and $R^{17'}$ together optionally represent a 5- or 6-membered aliphatic ring, wherein one C-atom in the 5- or 6-membered aliphatic ring is optionally replaced by oxygen, to form a pyrrolidine, piperidine, 2-methylpiperidine or morpholine radical, and
wherein the compound has a mean particle size of from 15 nm to 1000 nm.

2. The method according to claim 1, wherein X is $O(C_2H_4O)_nCH_3$ and n is 3 or 4.

3. The method according to claim 1, wherein $B^1$ in the formula (Ib) is —$CH_2$—$CH_2$— or —$CH_2$—HC(OH)—$CH_2$—.

4. The method according to claim 1, wherein $R^{20}$ and $R^{21}$ are independently of each other H or $OR^{16}$ and $R^{16}$ is $C_1$-$C_{12}$alkyl.

5. The method according to claim 1, wherein the printing ink is a non-aqueous printing ink.

6. The method according to claim 1, wherein the method improves a property of a print.

7. A printing ink, comprising:
a) at least one compound selected from the group consisting of a compound of the following formula (Ia) and a compound of the following formula (Ib):

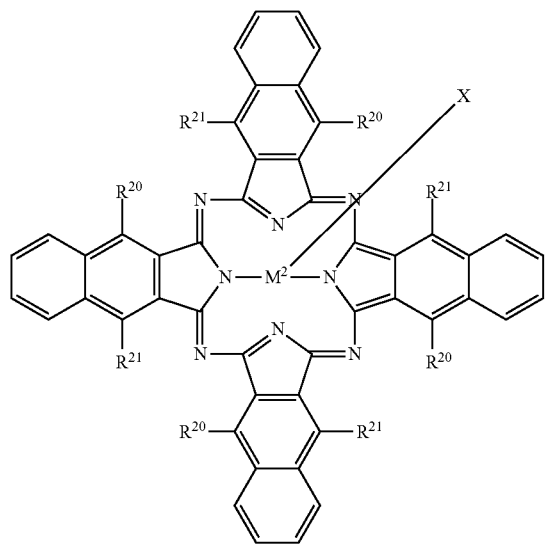

(Ia)

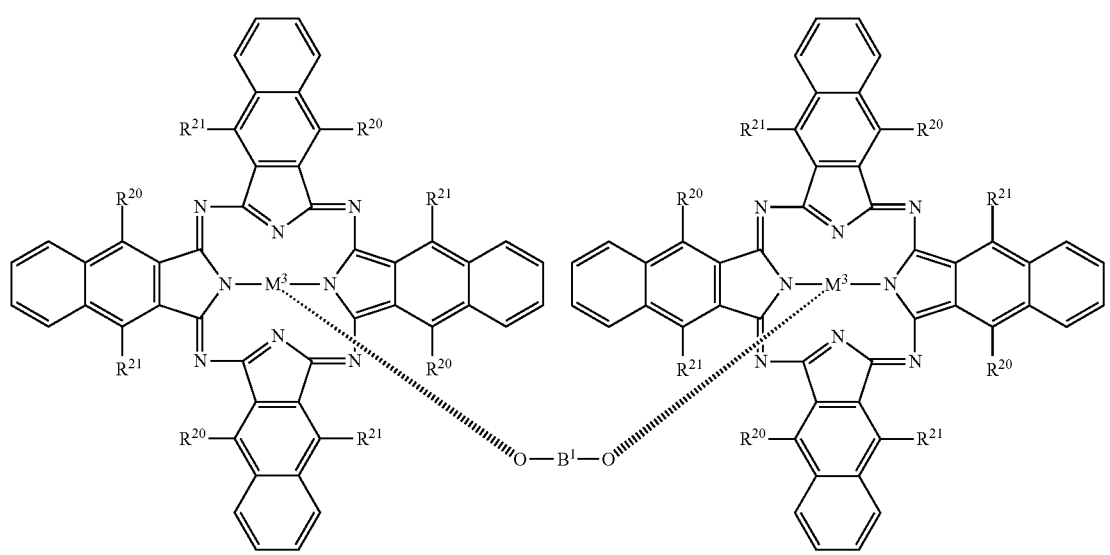

(Ib)

wherein

X is OH, O(C$_2$H$_4$O)$_n$CH$_3$, OC$_8$-C$_{18}$alkyl, or OSi(n-C$_1$-C$_{12}$alkyl)$_3$;

n is a integer from 1 to 6;

M$^2$, M$^3$ are Ga;

B$^1$ in the formula (Ib) is C$_1$-C$_{12}$alkylene, C$_1$-C$_{12}$alkylene which is interrupted by one or more oxygen atoms or C$_1$-C$_{12}$alkylene which is substituted by at least one OH group;

R$^{20}$ and R$^{21}$ are independently of each other H, F, OR$^{16}$, SR$^{16}$, NHR$^{17}$, or NR$^{17}$R$^{17'}$;

R$^{16}$ is C$_1$-C$_{12}$alkyl, (C$_2$H$_4$O)$_n$OR$^{18}$, or phenyl;

R$^{18}$ is C$_1$-C$_{12}$alkyl; and

R$^{17}$ and R$^{17'}$ are independently of each other C$_1$-C$_{12}$alkyl, (C$_2$H$_4$O)$_n$OR$^{18}$, or phenyl; or R$^{17}$ and R$^{17'}$ together optionally represent a 5- or 6-membered aliphatic ring, wherein one C-atom in the 5- or 6-membered aliphatic ring is optionally replaced by oxygen, to form a pyrrolidine, piperidine, 2-methylpiperidine or morpholine radical, b) at least one polymeric binder, c) optionally at least one organic solvent, d) optionally at least one colorant, e) optionally at least one further additive, and f) optionally at least one photoinitiator, and wherein the at least one compound a) has a mean particle size of from 15 nm to 1000 nm.

8. The printing ink according to claim 7, comprising:

from 0.0001 to 25% by weight of the at least one compound a), from 5 to 75% by weight of the at least one polymeric binder b), from 0 to 94.9999% by weight of the at least one organic solvent c), from 0 to 25% by weight of the at least one colorant d), and from 0 to 25% by weight of the at least one further additive e), wherein the sum of components a) to e) adds up to 100%.

9. A process for manufacturing a security document, the process comprising:

printing on a substrate with the printing ink formulation according to claim 7.

10. A security document, comprising a substrate and a cured ink,
wherein the cured ink comprises at least one compound selected from the group consisting of a compound of the following formula (Ia) and a compound of the following formula (Ib):

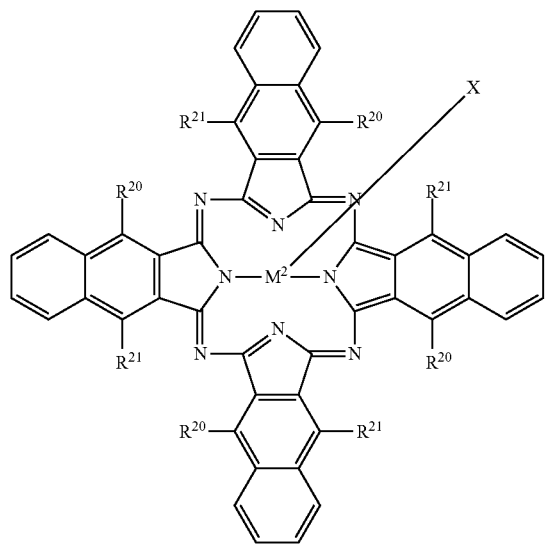

(Ia)

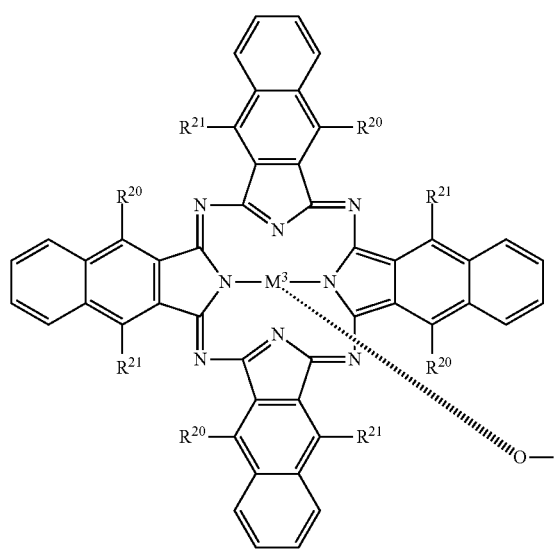

(Ib)

wherein
X is $O(C_2H_4O)_nCH_3$, $OC_8$-$C_{18}$alkyl, or $OSi(n$-$C_1$-$C_{12}alkyl)_3$;
n is a integer from 1 to 6;
$M^2$, $M^3$ are Ga;
$B^1$ in the formula (Ib) is $C_1$-$C_{12}$alkylene, $C_1$-$C_{12}$alkylene which is interrupted by one or more oxygen atoms or $C_1$-$C_{12}$alkylene which is substituted by at least one OH group;
$R^{20}$ and $R^{21}$ are independently of each other H, F, $OR^{16}$, $SR^{16}$, $NHR^{17}$, or $NR^{17}R^{17'}$;
$R^{16}$ is $C_1$-$C_{12}$alkyl, $(C_2H_4O)_nOR^{18}$, or phenyl;
$R^{18}$ is $C_1$-$C_{12}$alkyl; and
$R^{17}$ and $R^{17'}$ are independently of each other $C_1$-$C_{12}$alkyl, $(C_2H_4O)_nOR^{18}$, or phenyl; or $R^{17}$ and $R^{17'}$ together optionally represent a 5- or 6-membered aliphatic ring, wherein one C-atom in the 5- or 6-membered aliphatic ring is optionally replaced by oxygen, to form a pyrrolidine, piperidine, 2-methylpiperidine or morpholine radical, and wherein the at least one compound has a mean particle size of from 15 nm to 1000 nm.

11. The security document according to claim 10 obtained by a printing process, wherein a printing ink formulation comprising the at least one compound is used.

12. The security document according to claim 10, which is selected from the group consisting of a bank note, a passport, a check, a voucher, an ID- or transaction card, a stamp and a tax label.

13. The security document according to claim 10, which is part of a rigid or flexible packaging, of a carton board or of a brand or product label.

* * * * *

UNITED STATES PATENT AND TRADEMARK OFFICE
CERTIFICATE OF CORRECTION

PATENT NO. : 10,703,923 B2
APPLICATION NO. : 15/576005
DATED : July 7, 2020
INVENTOR(S) : Hans Reichert et al.

Page 1 of 1

It is certified that error appears in the above-identified patent and that said Letters Patent is hereby corrected as shown below:

In the Specification

Column 6, Line 7, "Rhopaque®" should read -- Ropaque® --,

In the Claims

Column 19, Line 47, Claim 7, "X is OH," should read -- X is --.

Signed and Sealed this
Eighth Day of December, 2020

Andrei Iancu
*Director of the United States Patent and Trademark Office*